(12) United States Patent
Moore

(10) Patent No.: US 10,201,894 B2
(45) Date of Patent: Feb. 12, 2019

(54) COLLET HYDRAULIC HAMMER BUSHING

(71) Applicant: Caterpillar Inc., Peoria, IL (US)

(72) Inventor: Cody Thomas Moore, Waco, TX (US)

(73) Assignee: Caterpillar Inc., Deerfield, IL (US)

( * ) Notice: Subject to any disclaimer, the term of this patent is extended or adjusted under 35 U.S.C. 154(b) by 575 days.

(21) Appl. No.: 14/853,789

(22) Filed: Sep. 14, 2015

(65) Prior Publication Data

US 2017/0072551 A1    Mar. 16, 2017

(51) Int. Cl.
| | |
|---|---|
| *B25D 17/08* | (2006.01) |
| *B25D 9/12* | (2006.01) |
| *E02F 3/96* | (2006.01) |
| *F15B 15/14* | (2006.01) |
| *B25D 9/04* | (2006.01) |
| *F16C 29/02* | (2006.01) |
| *F16C 29/12* | (2006.01) |
| *F16C 33/04* | (2006.01) |

(52) U.S. Cl.
CPC .............. *B25D 17/08* (2013.01); *B25D 9/04* (2013.01); *B25D 9/12* (2013.01); *E02F 3/966* (2013.01); *F15B 15/1447* (2013.01); *F16C 29/02* (2013.01); *F16C 29/126* (2013.01); *F16C 33/046* (2013.01); *B25D 2250/125* (2013.01)

(58) Field of Classification Search
CPC ...... B25D 2250/125; B25D 9/04; B25D 9/12; B25D 17/08; F16C 33/046; F16C 29/126; F16C 29/02; E02F 3/966; F15B 15/1447
USPC .......................................................... 173/90
See application file for complete search history.

(56) References Cited

U.S. PATENT DOCUMENTS

| | | | | |
|---|---|---|---|---|
| 1,973,942 | A | * | 9/1934 | Buhr ...................... B23B 31/20 279/49 |
| 2,405,825 | A | | 8/1946 | Grunow |
| 3,894,743 | A | * | 7/1975 | Hiroumi ................. B23B 31/20 279/140 |
| 6,328,116 | B1 | * | 12/2001 | Hurskainen .......... B25D 17/005 173/128 |
| 7,040,421 | B2 | | 5/2006 | Egerstrom |
| 7,152,692 | B2 | | 12/2006 | Hurskainen et al. |
| 8,360,167 | B2 | | 1/2013 | Jagdale et al. |
| 2010/0084451 | A1 | * | 4/2010 | Abla ........................ B25C 1/00 227/107 |

(Continued)

FOREIGN PATENT DOCUMENTS

| | | |
|---|---|---|
| DE | 19509651 | 9/1996 |
| DE | 20014712 U1 | 11/2000 |
| GB | 937080 | 9/1963 |

(Continued)

*Primary Examiner* — Thanh Truong
*Assistant Examiner* — Xavier A Madison
(74) *Attorney, Agent, or Firm* — Procopio, Cory, Hargreaves & Savitch LLP

(57) ABSTRACT

A bushing assembly for a reciprocating device is provided. The bushing assembly includes a hollow bushing housing, a collet guide member, and an adjuster mechanism. The hollow bushing housing has a substantially cylindrical shape and an angled inner sidewall. The collet guide member is disposed radially inward from and contacts the angled inner sidewall of the hollow bushing housing. The adjuster mechanism contacts a lower surface of the collet guide member and urges the collet guide member along the angled inner sidewall of the hollow bushing housing.

20 Claims, 3 Drawing Sheets

(56) References Cited

U.S. PATENT DOCUMENTS

2013/0081837 A1    4/2013  Jagdale et al.

FOREIGN PATENT DOCUMENTS

| KR | 10-0985931 B1 | 10/2010 |
| KR | 10-2015-0055592 A | 5/2015 |
| RU | 2162508 C1 | 1/2001 |
| WO | 2001083170 A1 | 11/2001 |

* cited by examiner

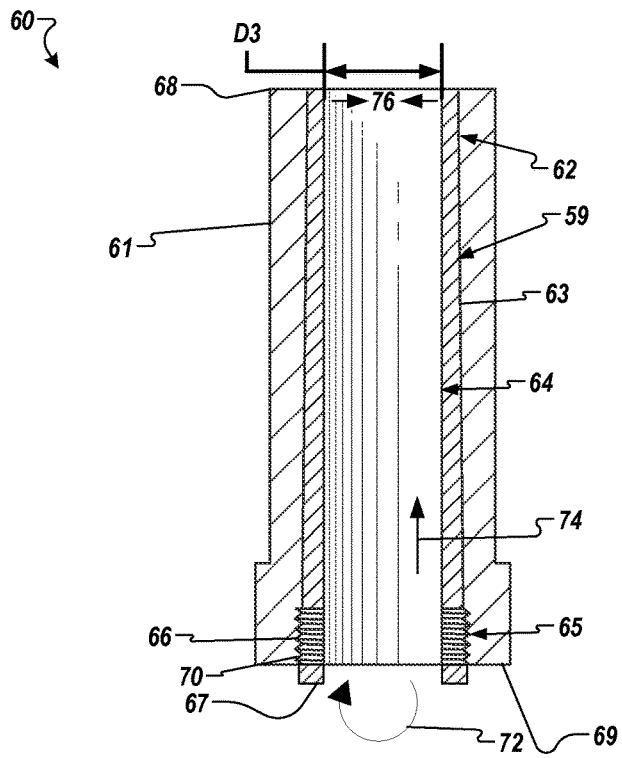
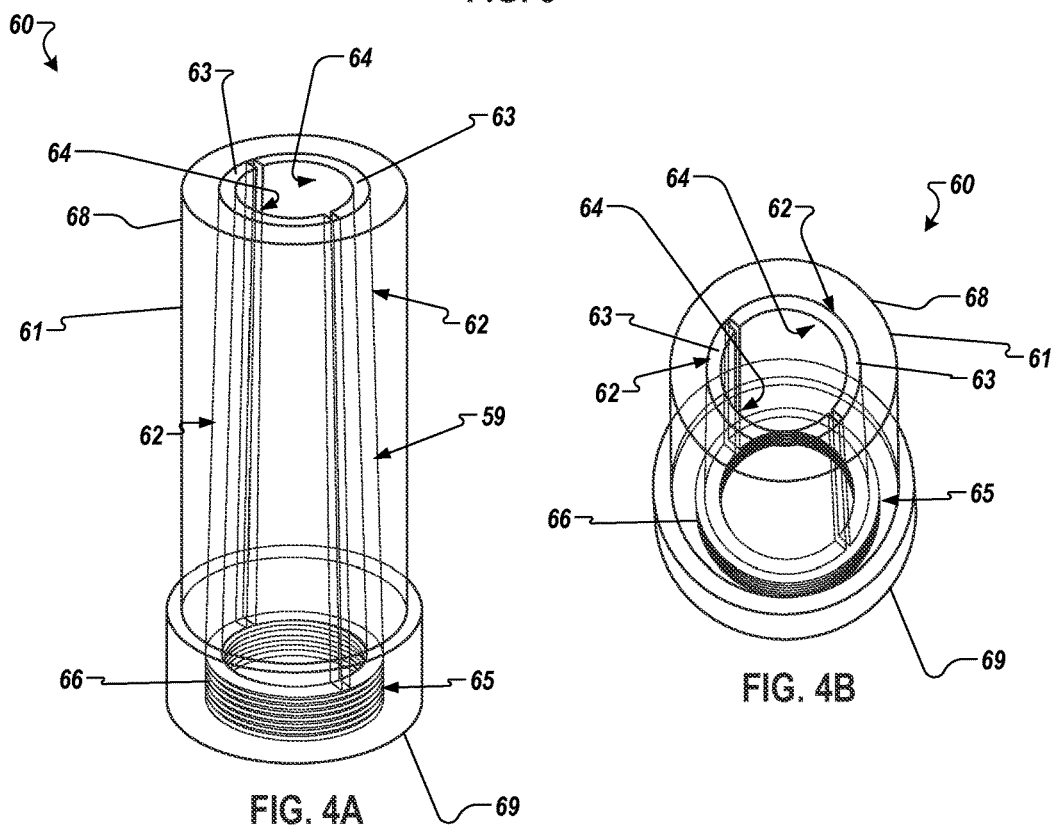
FIG. 3
FIG. 4A
FIG. 4B

COLLET HYDRAULIC HAMMER BUSHING

TECHNICAL FIELD

This patent disclosure relates generally to hydraulic hammers and, more particularly to a collet hydraulic hammer bushing.

BACKGROUND

Hydraulic hammers are used on work sites to break up large hard objects before such objects can be moved away. Hydraulic hammers may be mounted to back hoes or excavators or other machines. Typically, the hammer assembly is powered by either a hydraulic or pneumatic pressure source or a combination of both. The hydraulic pressure, pneumatic pressure, or combination thereof is used to drive a movable piston downward within a housing. During the power stroke, the downward moving piston strikes a work tool, which, in turn, is driven in the downward direction. During its downward movement, the work tool strikes the object to be broken up. To assist in alignment between the moving piston and the work tool, hammer bushings are provided within the housing. During operation of the hydraulic hammer, the bushings can wear down causing increased clearance between the bushings and the work tool. The increased clearance can cause improper alignment and damage to the work tool and piston.

U.S. Pat. No. 7,152,692 to HURSKAINEN is directed to a hydraulic hammer having a sealing bushing. The sealing bushing includes a percussion piston that delivers strokes to a tool. A lower part of the percussion piston is sealed with respect to a frame by the sealing bushing. The sealing bushing includes one or more lower seals. The sealing bushing does not contribute to the bearing of the percussion piston and it is arranged in place through the lower end of the hydraulic hammer. However, no mechanism for adjusting clearance is provided.

The present disclosure is directed toward overcoming one or more of the problems discovered by the inventors or that is known in the art.

SUMMARY OF THE DISCLOSURE

In one embodiment, a bushing assembly for a reciprocating device is provided. The bushing assembly includes a hollow bushing housing, a collet guide member, and an adjuster mechanism. The hollow bushing housing has a substantially cylindrical shape and an angled inner sidewall. The collet guide member is disposed radially inward from and contacts the angled inner sidewall of the hollow bushing housing. The adjuster mechanism contacts a lower surface of the collet guide member and urges the collet guide member along the angled inner sidewall of the hollow bushing housing.

In another embodiment, a hammer assembly is disclosed. The hammer assembly includes a work tool, a piston, and a bushing assembly. The work tool is configured for a reciprocating operation. The piston is movably disposed above the work tool. The piston moves in a first direction toward the work tool to drive the work tool in the first direction and moves in a second direction away from the work tool. The bushing assembly supports the work tool and aligns the work tool with the piston when the piston moves in the first direction. The bushing assembly includes a hollow bushing housing, a collet guide member, and an adjuster mechanism. The hollow bushing housing is disposed below the piston and the hollow bushing housing has a substantially cylindrical shape and an angled inner sidewall. The collet guide member contacts the work tool. The collet guide member is disposed radially inward from and contacts the angled inner sidewall of the hollow bushing housing. The adjuster mechanism contacts a lower surface of the collet guide member and is configured to selectively urge the collet guide member along the angled inner sidewall of the hollow bushing housing.

In yet another embodiment, a clearance adjusting mechanism for a bushing assembly is described. The clearance adjusting mechanism includes a housing, a work tool, a guide member, and an adjuster mechanism. The housing has an inner sidewall. The work tool is disposed within the housing. The guide member is disposed between the work tool and the inner sidewall of the housing. The adjuster mechanism contacts the guide member at a first end of the housing and urges the guide member away from the first end along the inner sidewall of the housing. The inner sidewall of the housing is angled to urge the guide member toward the work tool as the guide member is urged away from the first end.

BRIEF DESCRIPTION OF THE DRAWINGS

FIG. 3 is a schematic side sectional view of a bushing assembly according to the embodiment of the present disclosure.

FIGS. 4A and 4B are perspective views of the bushing assembly 60 according to the embodiment of the present disclosure.

DETAILED DESCRIPTION

Figure 2:
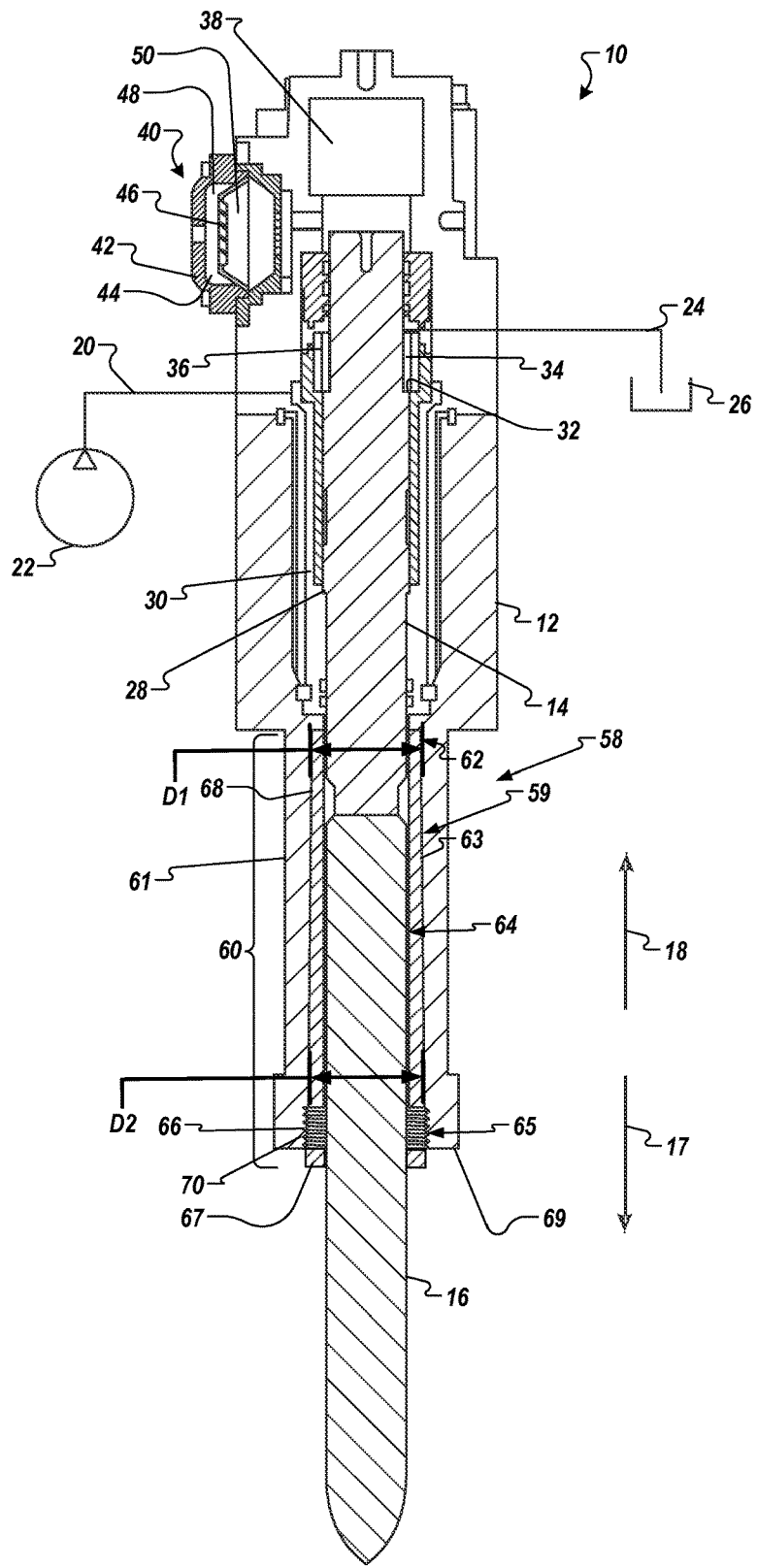
FIG. 2 is a schematic side sectional view of a hammer assembly according to an embodiment of the present disclosure.

This disclosure relates to a hydraulic hammer bushing assembly or clearance adjusting mechanism having a bushing housing with an angled inner sidewall, two or more guide pieces moveable within the housing and an adjuster mechanism for adjusting the position of the guide pieces within the housing to reduce clearance between the guide pieces and the work tool. With particular reference to FIG. 2 of the drawings, a cross-sectional view of an example embodiment of a hammer assembly 10 is provided. As may be understood by a person of ordinary skill in the art, the hammer assembly 10 may be attached to any suitable machine such as an excavator, backhoe loader, skid steer, or similar machine. While the bushing assembly is illustrated and described in connection with a hammer assembly, the bushing assembly has applicability in various other types of machines as well. For example, the guide pieces and adjuster mechanism may be used in any application involving a reciprocating tool requiring careful alignment between a moving component and a work tool.

Figure 1:
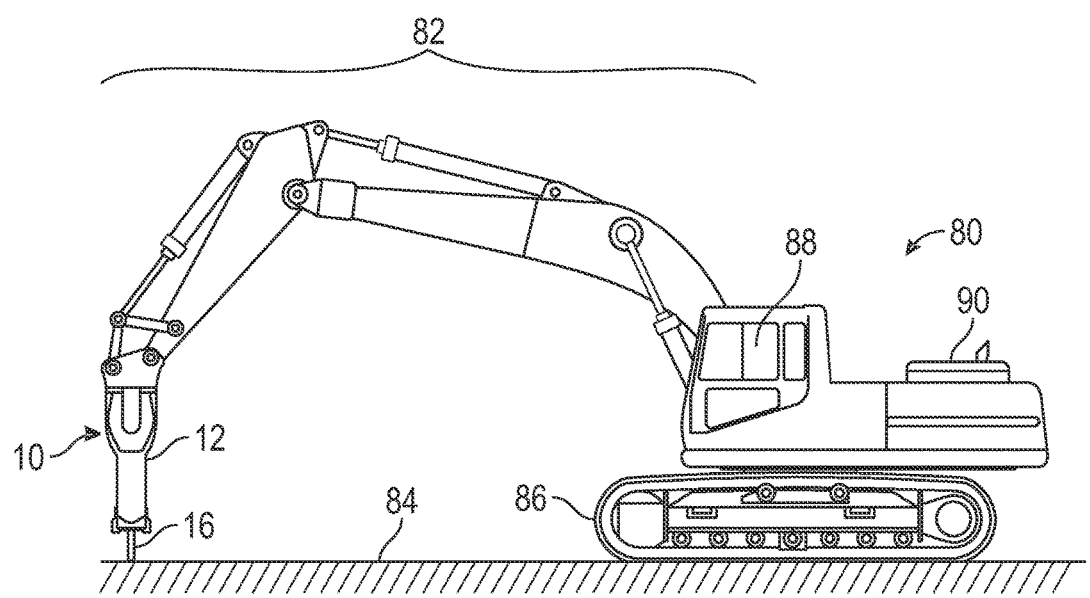
FIG. 1 is a perspective view of an example machine, which may us a hammer assembly according to an embodiment of the present disclosure.

FIG. 1 is a perspective view of an example machine 80, which may us a hammer assembly according to an embodiment of the present disclosure. Referring to FIG. 1, a hammer assembly 10 is attached to a machine 80. The machine 80 may embody a fixed or mobile machine that performs some type of operation associated with an industry such as mining, construction, farming, transportation, or any other industry known in the art. For example, machine 80 may be an earth moving machine such as a backhoe, an excavator, a dozer, a loader, a motor grader, or any other earth moving machine. Machine 80 may include an implement system 82 configured to move the hammer assembly 10, a drive system 86 for propelling the machine 80, a power source 90 that provides power to implement system 82 and drive system 86, and an operator station 88 for operator control of implement system 82 and drive system 86.

Power source 90 may embody an engine such as, for example, a diesel engine, a gasoline engine, a gaseous fuel-powered engine, or any other type of combustion engine known in the art. It is contemplated that power source 90 may alternatively embody a non-combustion source of power such as a fuel cell, a power storage device, or another source known in the art. Power source 90 may produce a mechanical or electrical power output that may then be converted to hydraulic pneumatic power for moving the implement system 82.

Implement system 82 may include a linkage structure acted on by fluid actuators to move the hammer assembly 10. The linkage structure of implement system 82 may be complex, for example, including three or more degrees of freedom. The implement system 82 may carry the hammer assembly 10 for breaking an object or ground surface 84. The structure and operation of a hammer assembly 10 are described in greater detail below.

FIG. 2 is a schematic side sectional view of a hammer assembly 10 according to an embodiment of the present disclosure. In some embodiments, the hammer assembly 10 may be symmetrical forming an enclosed assembly with one or more openings providing access to an interior of the assembly. As shown in FIG. 2, the hammer assembly 10 may include a housing 12 having a cylindrical shape. A piston 14 may be slidably supported within the housing 12 of the hammer assembly 10. Additionally, a work tool 16 may be supported by a bushing assembly 60 in a lower end 69 of the housing 12 with a portion of the work tool 16 extending outward therefrom. The work tool 16 may have any configuration, such as for example a chisel, that would be useful in hammering applications. The work tool 16 also may be configured so as to be removable so as to allow a variety of tools with different configurations to be attached to the hammer assembly 10.

The piston 14 may be supported by a bushing assembly 60 so as to be movable relative to the housing 12 in a reciprocating manner generally in the direction of arrow 17 and arrow 18 in FIG. 2. More specifically, during an impact or work stroke, the piston 14 moves in the general direction of arrow 17 and near the end of the work stroke comes into contact with the work tool 16 such as shown in FIG. 2. Conversely, during a return stroke, the piston 14 retracts away from contact with the work tool 16 (the position shown in FIG. 2) in the general direction of arrow 18. The reciprocating impacts of the piston 14 on the work tool 16, in turn, drive a corresponding reciprocating movement of the work tool 16. When the piston 14 strikes the work tool 16, the force of the piston 14 is transmitted to the work tool 16 in the general direction of arrow 17. This force may be applied to a hard object such as rock, concrete, or asphalt in order to break up the object.

The reciprocating movement of the piston 14 may be driven, at least in part, by pressurized fluid, such as pressurized hydraulic fluid, provided by a high pressure source connected to the power source 90 of the machine 80 via the implement system 82. To this end, the hammer assembly 10 may include a high pressure inlet 20 which is coupled to or in communication with a high pressure source, such as a hydraulic pump 22, and a low pressure outlet 24, which is coupled to or in communication with a low pressure region such as a reservoir or tank 26 (both the high pressure inlet 20 and the low pressure outlet 24 are shown schematically in FIG. 2). The hydraulic pump 22 and tank 26 may be provided by connecting the hammer assembly 10 to the hydraulic system of the machine 80 via the implement system 82.

For moving the piston 14 in a first or upward direction away from the work tool 16 (i.e., in the direction of arrow 18), the piston 14 may include a first or upward fluid engagement surface 28 that may be exposed to fluid pressure in a first fluid chamber 30 that is defined in the housing 12. The upward fluid engagement surface 28 may be in the form of an annular shoulder provided in the surface of the piston 14 and may be configured or oriented for moving the piston 14 in the direction of arrow 18 away from the work tool 16.

For moving the piston 14 in a second or downward direction towards the work tool 16 (i.e., in the direction of arrow 17), the piston 14 may further include a second or downward fluid engagement surface 32 that may be exposed to fluid pressure in a second fluid chamber 34. In this case, the downward fluid engagement surface 32 is arranged above the upward fluid engagement surface 28 on the piston 14 and also is in the form of an annular shoulder in the surface of the piston 14. The downward fluid engagement surface 32 may be configured with a larger effective surface area than the upward fluid engagement surface 28 such that the piston 14 is driven downward in the general direction of arrow 17 when both the first fluid chamber 30 and the second fluid chamber 34 are in communication with the high pressure inlet 20. When only the first fluid chamber 30 is in communication with the high pressure inlet 20, high pressure fluid only acts on the upward fluid engagement surface 28 and the piston 14 is driven upward.

A control valve assembly 36 may be provided that selectively connects the second fluid chamber 34 with either the high pressure inlet 20 or the low pressure outlet 24. The control valve assembly 36 may be configured such that movement of the piston 14 switches the control valve assembly 36 between connecting the second fluid chamber 34 with the high pressure inlet 20 and the low pressure outlet 24. In particular, the control valve assembly 36 may be configured such that when the piston 14 reaches a predetermined point in its upward return stroke, the control valve assembly 36 moves, such as in response to the application of a pilot pressure, to connect the second fluid chamber 34 with the hydraulic pump 22. The engagement of the high pressure fluid in the second fluid chamber 34 with the downward fluid engagement surface 32 stops the upward return stroke of the piston 14 and helps start the downward work stroke of the piston 14. Likewise, the control valve assembly 36 may be configured such that when the piston 14 reaches a predetermined point in its downward work stroke, the second fluid chamber 34 is connected to the tank 26 causing the high pressure fluid to vacate the second fluid chamber 34. This permits the piston 14 to begin its upward return stroke again in response to fluid pressure in the first fluid chamber 30 acting on the upward fluid engagement surface 28.

While a particular pressurized fluid system has been described, those skilled in the art will appreciate that the present disclosure is not limited to any particular pressurized fluid system and that any suitable arrangement capable of driving upward and downward reciprocating movement of the piston 14 may be used.

To generate a further downward force on the piston 14 for the work stroke, a gas chamber 38 may be provided in an upper portion of the housing 12 and into which an upper portion of the piston 14 extends. The gas chamber 38 may be charged with a trapped pressurized gas, such as nitrogen, that is compressible. The gas chamber 38 and piston 14 may be configured and arranged such that when the piston 14 retracts into the gas chamber 38 during its return stroke the piston 14 reduces the effective volume of the gas chamber 38 thereby compressing the gas. This increases the pressure of the gas in the gas chamber 38 and produces a downward biasing force on the upper end surface of the piston 14. The downward biasing force on the piston 14 increases the further the piston 14 is retracted into the gas chamber 38. When the second fluid chamber 34 is connected to the hydraulic pump 22 initiating the downward work stroke of the piston 14, the biasing force from the compressed gas in the gas chamber 38 combines with the downward force from the high pressure fluid acting on the downward fluid engagement surface 32 to drive the piston 14 downward and into engagement with the work tool 16.

For selectively and variably increasing or decreasing the downward biasing force on the piston 14 produced by the gas chamber 38, an accumulator assembly 40 may optionally be provided. The accumulator assembly 40 may include a housing 42 that defines an interior space 44 which may be divided by a barrier 46 into a first interior portion 48 containing a compressible gas and a second interior portion 50 that may receive a pressurized fluid, such as hydraulic fluid from the hydraulic system of the machine 80, or otherwise be incompressible. The accumulator assembly 40 may be arranged and configured such that the first interior portion 48 of the accumulator assembly 40 is in communication with the interior of the gas chamber 38.

As illustrated, the hammer assembly 10 also includes a bushing assembly 60 to help maintain alignment between the piston 14 and the work tool 16. The bushing assembly 60 includes a bushing housing 61, at least one collet guide member 63 and an adjuster mechanism 65. The bushing housing 61 is formed at an end of the housing 12 adjacent the work tool 16. As illustrated, the bushing housing 61 is formed as a contiguous lower portion 58 of the housing 12. However, example embodiments of the present application are not limited to this configuration and may have other configurations that may be apparent to a person of ordinary skill in the art. For example, the bushing housing 61 may be formed as a separate component attached or coupled to the housing 12 by, for example, welding, screw-fitting, press-fitting, etc.

The bushing housing 61 may be hollow and may have a substantially cylindrical shape. The bushing housing 61 may also include an inner sidewall 62 that contacts the at least one collet guide member 63 such that the at least one collet guide member 63 is disposed between the work tool 16 (and/or piston 14) and the bushing housing 61. The inner sidewall 62 of the bushing housing 61 may be angled such that an inner diameter D1 at an upper end 68 of the bushing housing 61 is less than an inner diameter D2 at a lower end 69 of the bushing housing 61 (i.e., D1<D2). The bushing housing 61 may also have a constant outer diameter such that the angled inner sidewall 62 forms a tapered thickness along bushing housing 61. The specific difference in diameter between D1 and D2 is not particularly limited. In some embodiments, the difference in diameter may be a quarter inch (¼ in.) or more.

The at least one collet guide member 63 includes an inner surface 64 that closely surrounds an end of the piston 14 and the work tool 16 at an upper end 68 of the bushing assembly 60. In some embodiments, the inner surface 64 may be curved to conform to the piston 14 and/or the work tool 16. By providing the inner surface 64 to closely surround the piston 14 and the work tool 16 at the upper end 68, the at least one collet guide member 63 may maintain alignment between the piston 14 and the work tool 16. Further, in some example embodiments, the at least one collet guide member 63 may also have a tapered outer surface 59 that conforms to and rides along the angled inner surface 62 of the bushing housing 61.

The adjuster mechanism 65 is located at a lower end 69 of the bushing assembly 60 and is positioned to contact a bottom or lower surface of the at least one collet guide member 63 such that the at least one collet guide member 63 is held urged upward against the inner sidewall 62 of the bushing housing 61. In some example embodiments, adjuster mechanism 65 has a threaded exterior 66 that engages a threaded inner region 70 in the lower end 69 of the bushing housing 61. In some example embodiments, the length of the threaded inner region 70 may be a quarter inch (¼ in.) or more.

Further, the adjuster mechanism 65 may also have a grip region 67 that may be used to rotate the adjuster mechanism 65 relative to the bushing housing 61. The grip region 67 may be structured to engage a wrench or other tool to allow rotation of the adjuster mechanism 65. By rotating the adjuster mechanism 65 relative to the bushing housing 61, the at least one collet guide member 63 may be urged upward as discussed in greater detail below. However, example embodiments of the present application are not limited to this configuration and have other configurations to allow the at least one collet guide member 63 to be urged upward, which may be apparent to a person of ordinary skill in the art. For example, the adjuster mechanism 65 may have a ratchet structure or other structure to allow the at least one collet guide member 63 to be urged upward.

FIG. 3 is a schematic side sectional view of a bushing assembly 60 according to the embodiment of the present disclosure. In FIG. 3, the bushing assembly 60 is illustrated separated from the remainder of the hammer assembly (10 in FIGS. 1 and 2). In some embodiments, the bushing assembly 60 may be formed as a separate component attached to the housing 12 of the hammer assembly 10 via welding, screw-fitting, press-fitting, or any other attachment mechanism that may be apparent to a person of ordinary skill in the art. In other embodiments, the bushing assembly 60 may be integrally formed with the housing 12 of the hammer assembly 10.

As discussed above, the bushing assembly 60 includes a bushing housing 61, at least one collet guide member 63 and an adjuster mechanism 65. The bushing housing 61 includes an angled inner sidewall 62 that contacts the at least one collet guide member 63. The inner sidewall 62 of the bushing housing 61 is angled such that an inner diameter D1 at an upper end 68 of the bushing housing 61 is greater than an inner diameter D2 at a lower end 69 of the bushing housing 61 (i.e., D1>D2). The adjuster mechanism 65 is located at a lower end 69 of the bushing assembly 60 and is positioned to contact the bottom of the at least one collet guide member 63.

As discussed above the adjuster mechanism 65 has a threaded exterior 66 that engages a threaded inner region 70 in the lower end 69 of the bushing housing 61. The adjuster mechanism 65 may also have a grip region 67 that may be used to rotate the adjuster mechanism 65 relative to the bushing housing 61. By rotating the adjuster mechanism 65 in a direction 72 relative to the bushing housing 61, the at least one collet guide member 63 may be urged upward in direction 74 as illustrated. As the adjuster mechanism 65 urges the at least one collet guide member 63 upward in direction 74, the at least one collet guide member 63 may be urged inwardly (i.e., in direction 76) at the upper end 68 of the bushing housing 61 by the angled inner sidewall 62 of the bushing housing 61. Thus, rotation of the adjuster mechanism 65 may allow reduction of the diameter D3 of the at least one collet guide member 63.

FIGS. 4A and 4B are perspective views of the bushing assembly 60 according to the embodiment of the present disclosure. As illustrated the bushing housing 61 of the bushing assembly 60 has a generally cylindrical shape. Within the bushing housing 61, a pair of semi-circular collet guide members 63 may be provided. The pair of collet guide members 63 collectively form an annular shape as illustrated. As discussed above, the collet guide members 63 ride along the inner sidewall 62 of the bushing housing 61 and can be urged upward by rotation of the adjuster mechanism 65. As the collet guide members 63 are urged upward, the angled inner sidewall 62 of the bushing housing 61 urges the collet guide members 63 inward.

In this example embodiment, a pair of collet guide members 63 is illustrated, but example embodiments are not limited to this configuration and may have other configurations that may be apparent to a person of ordinary skill in the art. For example, other example embodiments may include three or more collet guide members 63 configured to ride along the inner sidewall 62 of the bushing housing 61.

Industrial Applicability

The present disclosure generally applies to a hammer assembly 10 having a bushing assembly 60. The bushing assembly 60 described herein may be implemented in hydraulic hammers or other reciprocating device of any size or configuration that includes a work tool 16 moving back and forth in a reciprocating operation. As referenced above, an embodiment of a hammer assembly 10 illustrated in FIG. 2, reciprocating movement of the piston 14 may be driven, at least in part, by pressurized fluid, such as pressurized hydraulic fluid, provided by a high pressure source connected to the power source 90 of the machine 80 via the implement system 82. Specifically, the piston 14 may be moved in the upward direction away from the work tool 16 (i.e., in the direction of arrow 18; in some embodiments the upward direction away from the work tool 16 may be identified as a direction opposite the working direction described below), by providing pressurized fluid from the hydraulic pump 22 into the first fluid chamber 30 via the high pressure inlet 20 with the control valve assembly 36 in a closed position. As the pressurized fluid is provided into the first fluid chamber 30, the pressurized fluid may contact the upward fluid engagement surface 28 to move the piston 14 in the direction of arrow 18 away from the work tool 16. To moving the piston 14 in the downward direction towards the work tool 16 (i.e., in the direction of arrow 17; in some embodiments the downward direction toward the work tool 16 may be identified as a working direction), the pressurized fluid is provided from the hydraulic pump 22 into the second fluid chamber 34 via the high pressure inlet 20 with the control valve assembly 36 in a closed position. As the pressurized fluid is provided to the second fluid chamber 34, the pressurized fluid may contact a downward fluid engagement surface 32 of the piston 14. As the downward fluid engagement surface 32 may be configured with a larger effective surface area than the upward fluid engagement surface 28 such that the piston 14 is driven downward in the general direction of arrow 17 when both the first and second fluid chambers 30, 34 are in communication with the high pressure inlet 20. Conversely, when only the first fluid chamber 30 is in communication with the high pressure inlet 20, high pressure fluid only acts on the upward fluid engagement surface 28 and the piston 14 is driven upward. Those skilled in the art will appreciate that the present disclosure is not limited to the specific pressurized fluid system and other suitable arrangements capable of driving upward and downward reciprocating movement of the piston 14 may be used.

To maintain alignment between the work tool 16 and the piston 14, the bushing assembly 60 closely surrounds the piston 14 and the work tool 16. Specifically, the at least one collet guide member 63 contacts the work tool 16 and the piston 14 at an upper end 68 of the bushing housing 61. During reciprocal operation of the piston 14 and the work tool 16, the inner surface 64 of the at least one guide member 63 can quickly wear down due to friction between the piston 14 (and/or work tool 16) and the surface 64 of the at least one guide member 63. As the surface 64 of the at least one guide member 63 wears down, clearance between the at least one guide member 63 and the piston 14 (and/or work tool 16) can increase. As the clearance increases, the alignment between the piston 14 and work tool 16 may decrease resulting in potential damage to the piston 14 and/or work tool 16.

When the clearance increases, the adjuster mechanism 65 may be rotated using the grip region 67 to urge the at least one guide member 63 upward along the inner sidewall 62 of the bushing housing 61. Due to the angle of the inner sidewall 62 of the bushing housing 61, the inner sidewall 62 urges the at least one guide member 63 toward the work tool 16 (and/or piston 14) reducing the clearance. By providing the bushing assembly 60 as a clearance adjusting mechanism according to an embodiment of the present application, a need to refurbish or replace the guide member 63 may be reduced or eliminated. Further, by maintaining alignment between the work tool 16 and the piston 14, damage to the work tool 16 and/or piston 14 may be reduced and a need to repair the hammer assembly 10 may be reduced in some embodiments of the present application. Reduced repairs and replacement may save time due to down time of the hammer assembly 10 and may also save money on repair costs.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Further, embodiments of the present application are described herein with reference to a hydraulic or hydromechanical hammer assemblies, but embodiments of the present application are not limited to hydraulic or hydromechanical hammer assemblies, and may include other hydro-mechanical devices having a self-charging assembly as described herein.

All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A bushing assembly for a reciprocating device, the reciprocating device having a piston cabable of a reciprocating movement which drives a work tool located in the bushing assembly, the bushing assembly comprising:
   a hollow bushing housing having a substantially cylindrical shape, an angled inner sidewall, an open upper end for receiving a piston, and an open lower end through which a work tool can extend;
   a plurality of guide members disposed radially inward from and contacting the angled inner sidewall of the hollow bushing housing, each of the plurality of guide members having a bottom surface; and
   an adjuster mechanism, proximate the open lower end of the hollow bushing housing, contacting the bottom surface of each of the plurality of guide members and configured to selectively urge each of the plurality of guide members along the angled inner sidewall of the hollow bushing housing in the direction of the open upper end, wherein the adjuster mechanism does not extend above the bottom surface of each of the plurality of guide members.

2. The bushing assembly of claim 1, wherein the plurality of guide members comprises a pair of semi-circular guide members, the pair of semi-circular guide members collectively forming an annular shape.

3. The bushing assembly of claim 1, wherein the hollow bushing housing comprises a threaded inner region in the open lower end thereof; and
   wherein the adjuster mechanism comprises a threaded exterior configured to engage the threaded inner region of the hollow bushing housing such that rotation of the adjuster mechanism relative to the hollow bushing housing causes the adjuster mechanism to urge the plurality of guide members into the hollow bushing housing.

4. The bushing assembly of claim 1, wherein the angled inner sidewall of the hollow bushing housing forms a first inner diameter proximate the open lower end of the hollow bushing housing and a second, smaller inner diameter proximate the open upper end of the hollow bushing housing.

5. The bushing assembly of claim 4, wherein the hollow bushing housing further comprises a threaded inner region at the open lower end of the hollow bushing housing; and
   wherein the adjuster mechanism comprises a threaded exterior configured to engage the threaded inner region of the hollow bushing housing such that rotation of the adjuster mechanism relative to the hollow bushing housing causes the adjuster mechanism to urge the plurality of guide members toward the open upper end of the hollow bushing housing.

6. The bushing assembly of claim 1, wherein the plurality of guide members comprises a tapered outer surface, the tapered outer surface conforming to and contacting the angled inner sidewall of the hollow bushing housing.

7. The bushing assembly of claim 1, wherein the adjuster mechanism comprises a grip region configured to engage a tool for rotation thereby.

8. A reciprocating device comprising:
   a work tool configured for a reciprocating operation; and
   the bushing assembly of claim 1, wherein the plurality of guide members of the bushing assembly contacts the work tool to align the work tool during reciprocating operation.

9. A hammer assembly comprising:
   a work tool configured for reciprocating operation;
   a piston movably disposed above the work tool, the piston configured to move in a first direction toward the work tool to drive the work tool in the first direction and to move in a second direction away from the work tool; and
   a bushing assembly configured to support the work tool, and align the work tool with the piston when the piston moves in the first direction driving the work tool in the first direction, the bushing assembly comprising:
      a hollow bushing housing disposed below the piston, the hollow bushing housing having a substantially cylindrical shape, an angled inner sidewall, an open upper end proximate the piston, and an open lower end;
      two or more guide members configured to align the work tool with the piston, the two or more guide members being disposed radially inward from and contacting the angled inner sidewall of the hollow bushing housing and each having a bottom surface; and
      an adjuster mechanism proximate the open lower end of the hollow bushing housing between the open lower end and the bottom surface of the two or more guide members, contacting the bottom surface of the two or more guide members and configured to selectively urge the two or more guide members along the angled inner sidewall of the hollow bushing housing in the direction of the open upper end.

10. The hammer assembly of claim 9, wherein the two or more guide members comprises a pair of semi-circular guide members, the pair of semi-circular guide members collectively forming an annular shape configured to surround the work tool and align the work tool with the piston.

11. The hammer assembly of claim 9, wherein the hollow bushing housing comprises a threaded inner region at the open lower end of the hollow bushing housing opposite the piston; and
    wherein the adjuster mechanism comprises a threaded exterior configured to engage the threaded inner region of the hollow bushing housing such that rotation of the adjuster mechanism relative to the hollow bushing housing causes the adjuster mechanism to urge the two or more guide members into the hollow bushing housing toward the piston.

12. The hammer assembly of claim 9, wherein the angled inner sidewall of the hollow bushing housing forms a first inner diameter at the open lower end of the hollow bushing housing opposite the piston and a second, smaller inner diameter at the open upper end of the hollow bushing housing adjacent the piston.

13. The hammer assembly of claim 12, wherein the hollow bushing housing further comprises a threaded inner region at the open lower end of the hollow bushing housing; and wherein the adjuster mechanism comprises a threaded exterior configured to engage the threaded inner region of the hollow bushing housing such that rotation of the adjuster mechanism relative to the hollow bushing housing causes the adjuster mechanism to urge the two or more guide members toward the open upper end of the hollow bushing housing.

14. The hammer assembly of claim 9, wherein the two or more guide members comprises a tapered outer surface, the tapered outer surface conforming to and contacting the angled inner sidewall of the hollow bushing housing.

15. The hammer assembly of claim 9, wherein the adjuster mechanism comprises a grip region configured to engage a tool for rotation thereby, and wherein the grip region extends below the lower surfaces of the two or more guide members to a location below and exterior of the hollow bushing housing.

16. A clearance adjusting mechanism for a bushing assembly for a reciprocating device, the reciprocating device having a piston cabable of a reciprocating movement which drives a work tool located in the bushing assembly, the adjusting mechanism comprising:

a hollow housing having an inner sidewall, an open upper end for receiving a piston, an open lower end and a threaded inner region proximate the open lower end;

a work tool disposed within the housing and extending beyond the open lower end;

a guide member disposed between the work tool and the inner sidewall of the housing, having a bottom surface proximate the open lower end and configured to guide the work tool during a reciprocating motion;

an adjuster mechanism contacting the bottom surface of the guide member proximate the open lower end of the housing, the adjuster mechanism does not extend above the bottom surface of each of the plurality of guide members and is configured to urge the guide member away from the open lower end along the inner sidewall of the housing, the inner sidewall being angled to urge the guide member toward the work tool as the guide member is urged away from the open lower end, wherein the adjuster mechanism includes a threaded exterior configured to engage the threaded inner region of the housing such that rotation of the adjuster mechanism relative to the housing causes the adjuster mechanism to urge the guide member away from the open lower end of the housing.

17. The clearance adjusting mechanism of claim 16, wherein the guide member has a curved shape, which conforms to the work tool.

18. The clearance adjusting mechanism of claim 16, wherein the guide member includes a tapered outer surface, the tapered outer surface conforming to and contacting the angled inner sidewall of the housing.

19. The clearance adjusting mechanism of claim 16, wherein the guide member includes a pair of semi-circular guide members, the pair of semi-circular guide members collectively forming an annular shape.

20. A reciprocating device comprising:

the clearance adjusting mechanism of claim 16; and a piston configured to drive the work tool through a reciprocating operation, wherein the guide member contacts the work tool to align the work tool with the piston.

* * * * *